United States Patent
Sakurai

(10) Patent No.: US 6,345,803 B2
(45) Date of Patent: Feb. 12, 2002

(54) PIEZOELECTRIC FLUID CONTROL VALVE

(75) Inventor: Toyonobu Sakurai, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/836,356

(22) Filed: Apr. 18, 2001

(30) Foreign Application Priority Data

May 8, 2000 (JP) ...................................... 2000-134831

(51) Int. Cl.$^7$ ............................................. F16K 31/02
(52) U.S. Cl. ........................... 251/129.06; 251/129.02; 251/129.14; 310/328
(58) Field of Search ...................... 251/129.02, 129.06, 251/331, 129.14; 310/328

(56) References Cited

U.S. PATENT DOCUMENTS

| | | | | |
|---|---|---|---|---|
| 3,598,506 A | * | 8/1971 | O'Neill | 417/383 |
| 5,145,147 A | * | 9/1992 | Nakazwa et al. | 251/129.06 |
| 5,470,045 A | * | 11/1995 | Kazama et al. | 251/129.15 |
| 5,865,421 A | * | 2/1999 | Ono | 251/129.02 |
| 6,172,445 B1 | * | 1/2001 | Heinz et al. | 310/328 |

FOREIGN PATENT DOCUMENTS

| | | |
|---|---|---|
| JP | 5-346183 | 12/1993 |
| JP | 6-042663 | 2/1994 |
| JP | 7-190225 | 7/1995 |
| JP | 10-231944 | 9/1998 |
| JP | 11-108227 | 4/1999 |
| JP | 11-173440 | 6/1999 |

OTHER PUBLICATIONS

U.S. application No. 09/836,356, filed Apr. 18, 2001, pending.
U.S. application No. 09/836,361, filed Apr. 18, 2001, pending.
U.S. application No. 09/836,362, filed Apr. 18, 2001, pending.

* cited by examiner

Primary Examiner—Joseph A. Kaufman
Assistant Examiner—Patrick Buechner
(74) Attorney, Agent, or Firm—Oblon, Spivak, McClelland, Maier & Neustadt, P.C.

(57) ABSTRACT

The piezoelectric element laminate 20 which expands due to application of a voltage is disposed between a diaphragm valve 11 applied with elastic force in a valve opening direction and a valve spring mechanism 25, a distortion amount a of the piezoelectric element laminate 20 in expansion is set to be larger than an opening/closing stroke b of the diaphragm valve 11, and a spring seat 28 separates from a second stopper 30 due to a difference c between the distortion amount a and the opening/closing stroke b. As a result, when the piezoelectric element laminate 20 expands to seat the diaphragm valve 11 on a valve seat 10, the valve spring 29 is compressed and repulsing force of the valve spring 29 acts on the diaphragm valve 11 through the piezoelectric element laminate 20 and the diaphragm valve 11 is pressed against the valve seat 10 by the repulsing force.

10 Claims, 3 Drawing Sheets

PIEZOELECTRIC FLUID CONTROL VALVE

FIELD OF THE INVENTION

The present invention relates to a piezoelectric fluid control valve which is the fluid control valve opened and closed by piezoelectric elements and more specifically to a normally opened piezoelectric fluid control valve in which an open state of the valve is maintained in non-operation.

PRIOR ART

A piezoelectric fluid control valve which is a fluid control valve opened and closed by a piezoelectric element laminate formed by laminating a plurality of piezoelectric elements is known as disclosed in Japanese Patent Application Laid-open No. 11-173440, for example. This fluid control valve is of a type in which a valve member is opened and closed by using expanding and contracting forces of the piezoelectric element laminate, has an advantage that large operating force can be obtained, and is generally formed as a normally closed type. In the normally closed fluid control valve, a closed state of the valve member is maintained by repulsing force of a valve spring in non-operation when the piezoelectric element laminate is not energized and the valve spring is compressed by expanding force of the piezoelectric element laminate to open the valve member when the piezoelectric element laminate is energized.

However, because a normally opened fluid control valve is advantageous in some cases depending on use of the fluid control valve, the fluid control valve having a normally opened structure is also proposed. In Japanese Patent Application Laid-open No. 11-108227, an example of such a normally opened fluid control valve is disclosed. This example is of a type in which a valve seat is opened and closed with a metal diaphragm valve. In non-operation when a piezoelectric element laminate is not applied with a voltage, the piezoelectric element laminate is displaced in such a direction as to separate from the metal diaphragm valve by repulsing force of a return spring and, as a result, the metal diaphragm valve opens the valve seat with its own elastic force. When the piezoelectric element laminate is applied with the voltage, the piezoelectric element laminate compresses the return spring with its expanding force to press the metal diaphragm valve against the valve seat.

However, because the diaphragm valve is directly pressed against the valve seat by the large expanding force of the piezoelectric element laminate in the prior-art normally opened fluid control valve as described above, the diaphragm valve and the valve seat are likely to be deformed or damaged and there are problems with durability and safety.

DISCLOSURE OF THE INVENTION

It is a technical object of the present invention to provide a normally opened piezoelectric fluid control valve with a rational design structure and excellent durability in which valve closing force can be obtained by repulsing force of a spring by converting expanding force of a piezoelectric element laminate into the repulsing force of the spring.

To achieve the above object, according to the present invention, there is provided a piezoelectric fluid control valve comprising a valve mechanism portion for opening and closing a fluid flow path by displacement of a diaphragm valve and a piezoelectric operating portion for opening and closing the diaphragm valve. The valve mechanism portion includes in a first casing the fluid flow paw path, a valve seat provided in the fluid flow path, the diaphragm valve for coming in contact with and separating from the valve seat to open and close the fluid flow path, and a pressing member in contact with a back face of the diaphragm valve. The piezoelectric operating portion includes in a second casing a piezoelectric element laminate for expanding due to application of a voltage, a first member for transmitting expanding force of the piezoelectric element laminate to the pressing member to seat the diaphragm valve on the valve seat, a spring seat displaced with a second member in expansion of the piezoelectric element laminate, and a valve spring elastically deformed by displacement of the spring seat, and a distortion amount of the piezoelectric element laminate in expansion is set at such a value as to press the pressing member to seat the diaphragm valve on the valve seat and as to press the spring seat in a reverse direction to elastically deform the valve spring.

In the fluid control valve of the invention having the above structure, in non-operation, the diaphragm valve separates from the valve seat due to its own elastic force to maintain an open state of the valve. If a certain amount of voltage is applied to the piezoelectric element laminate in this state, the piezoelectric element laminate expands in an axial direction, pushes the pressing member to seat the diaphragm valve on the valve seat, and pushes the spring seat in the reverse direction to elastically deform the valve spring. As a result, the repulsing force of the valve spring acts on the diaphragm valve through the piezoelectric element laminate and the diaphragm valve is pressed against the valve seat by the repulsing force. In other words, expanding force of the piezoelectric element laminate is converted into the repulsing force of the valve spring and the force for seating the diaphragm valve is obtained by the repulsing force. Therefore, because the large expanding force of the piezoelectric element laminate does not directly act on the diaphragm valve and the valve seat, the diaphragm valve and the valve seat are not deformed or damaged and durability and safety are improved.

According to a preferable concrete embodiment of the invention, the first casing and the second casing are connected to each other with an end of the second casing fitted in a valve hole of the first casing, an outer peripheral portion of the diaphragm valve is airtightly sandwiched and fixed between a tip end portion of the second casing and a peripheral bottom portion of the valve hole, and the pressing member is retained for displacement in the second casing.

According to another concrete embodiment of the invention, the spring seat is mounted such that a position of the spring seat can be adjusted by using an adjusting screw and the adjusting screw is displaced by the second member.

It is preferable in the invention that the second casing of the piezoelectric operating portion has a first stopper to which the pressing member is locked to thereby restrict an opening stroke end of the diaphragm valve when the piezoelectric element laminate is not energized and a second stopper to which the spring seat is locked to thereby restrict an expanding end of the valve spring.

In the invention, it is possible that the pressing member and the first member are in contact with each other through a ball fitted in depressions formed at centers of opposed faces.

According to another concrete embodiment of the invention, the first casing has on an end face thereof opposite to a side connected to the second casing a mounting face to be mounted to a unit substrate and a plurality of fluid ports communicating with the fluid flow path are provided to the mounting face.

DETAILED DESCRIPTION

Figure 1:
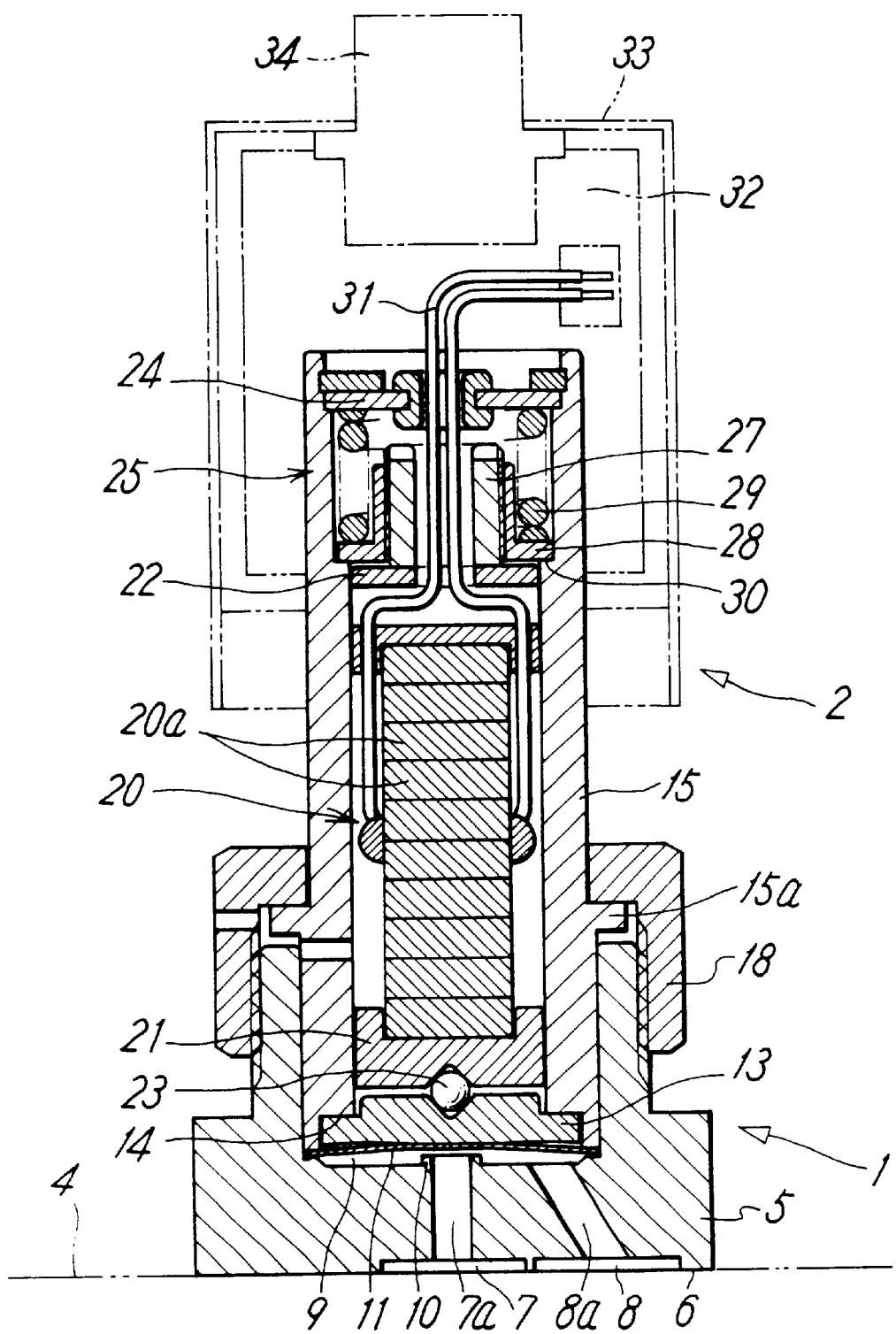
FIG. 1 is a sectional view of a non-operating state showing an embodiment of a piezoelectric fluid control valve according to the present invention.

FIG. 1 shows a preferable representative embodiment of a piezoelectric fluid control valve according to the present invention. This fluid control valve is of a normally opened type in which an open state of the valve is maintained in non-operation and is formed by integrally connecting a valve mechanism portion 1 for controlling a flow of fluid such as process gas and a piezoelectric operating portion 2 for operating the valve mechanism portion 1.

The valve mechanism portion 1 has a first casing 5 substantially in a circular-cylindrical shape. An end face of axial one end of the first casing 5 is formed with a mounting face 6 to be mounted to a unit substrate 4 of a gas control unit in a semiconductor wafer producing apparatus or the like and the mounting face 6 is formed with a plurality of fluid ports 7 and 8. In the first casing 5, flow paths 7a and 8a for connecting the ports 7 and 8, a valve hole 9 into which the flow paths 7a and 8a open, and a valve seat 10 for surrounding an opening portion of the one flow path 7a in the valve hole 9 are formed. In the valve hole 9, a diaphragm valve 11 for coming in contact with and separating from the valve seat 10 to open and close the flow path 7a is provided. The diaphragm valve 11 is made of metal and is fixed in the valve hole 9 by airtightly sandwiching an outer peripheral portion of the diaphragm valve 11 between a second casing 15 of the piezoelectric operating portion 2 and a valve hole peripheral bottom portion and elastic force in such a direction that the diaphragm valve 11 separates from the valve seat 10 is applied to the diaphragm valve 11.

A pressing member 13 in contact with the diaphragm valve 11 to be displaced with the diaphragm valve 11 in opening and closing directions of the diaphragm valve 11 is disposed on a back face of the diaphragm valve 11. The pressing member 13 is housed in a tip end of the cylindrical second casing 15 and is locked to a first stopper 14 at the tip end of the second casing 15 in opening of the diaphragm valve 11 to thereby restrict an opening stroke end of the diaphragm valve 11.

On the other hand, the piezoelectric operating portion 2 has the second casing 15. By screwing a nut member 18 engaged with a flange portion 15a of an outer periphery over the first casing 5 with a tip end portion of the second casing 15 fitted in the valve hole 9 of the first casing 5, the second casing 15 is coaxially connected to the first casing 5.

In the second casing 15, a piezoelectric element laminate 20 which is formed by laminating a plurality of piezoelectric elements 20a and expands in an axial direction due to application of a voltage and cap-shaped first and second members 21 and 22 which are respectively in contact with opposite ends of the piezoelectric element laminate 20 and are axially displaced as the piezoelectric element laminate 20 expands and contracts are disposed. The first member 21 is fitted with a tip end portion of the piezoelectric element laminate 20 and transmits expanding force of the piezoelectric element laminate 20 to the pressing member 13 to seat the diaphragm valve 11 on the valve seat 10. The first member 21 and the pressing member 13 are in contact with each other through a ball 23 fitted in depressions respectively formed at centers of opposed faces. On the other hand, the second member 22 is mounted to a rear end portion of the piezoelectric element laminate 20 and a spring mechanism 25 is provided between the second member 22 and a plate 24 fixed to an end portion of the second casing 15.

The valve spring mechanism 25 includes an adjusting screw 27 in contact with an outer end face of the second member 22 to be displaced with the second member 22 in an axial direction of the second casing 15, a spring seat 28 screwed over the adjusting screw 27 such that a position of the spring seat 28 is adjustable, and a coil-shaped valve spring 29 provided between the spring seat 28 and the plate 24. The spring seat 28 restricts a maximum expanding position of the valve spring 29 by being locked to a second stopper 30 provided to a rear end portion of the second casing 15 in non-operation of the control valve to thereby prevent repulsing force of the valve spring 29 from acting on the piezoelectric element laminate 20 and the diaphragm valve 11 and is pushed and moved by the piezoelectric element laminate 20 through the second member 22 in such a direction as to separate from the second stopper 30 to elastically deform the valve spring 29 in operation of the control valve to thereby cause the repulsing force of the valve spring 29 to act on the piezoelectric element laminate 20.

Figure 3:
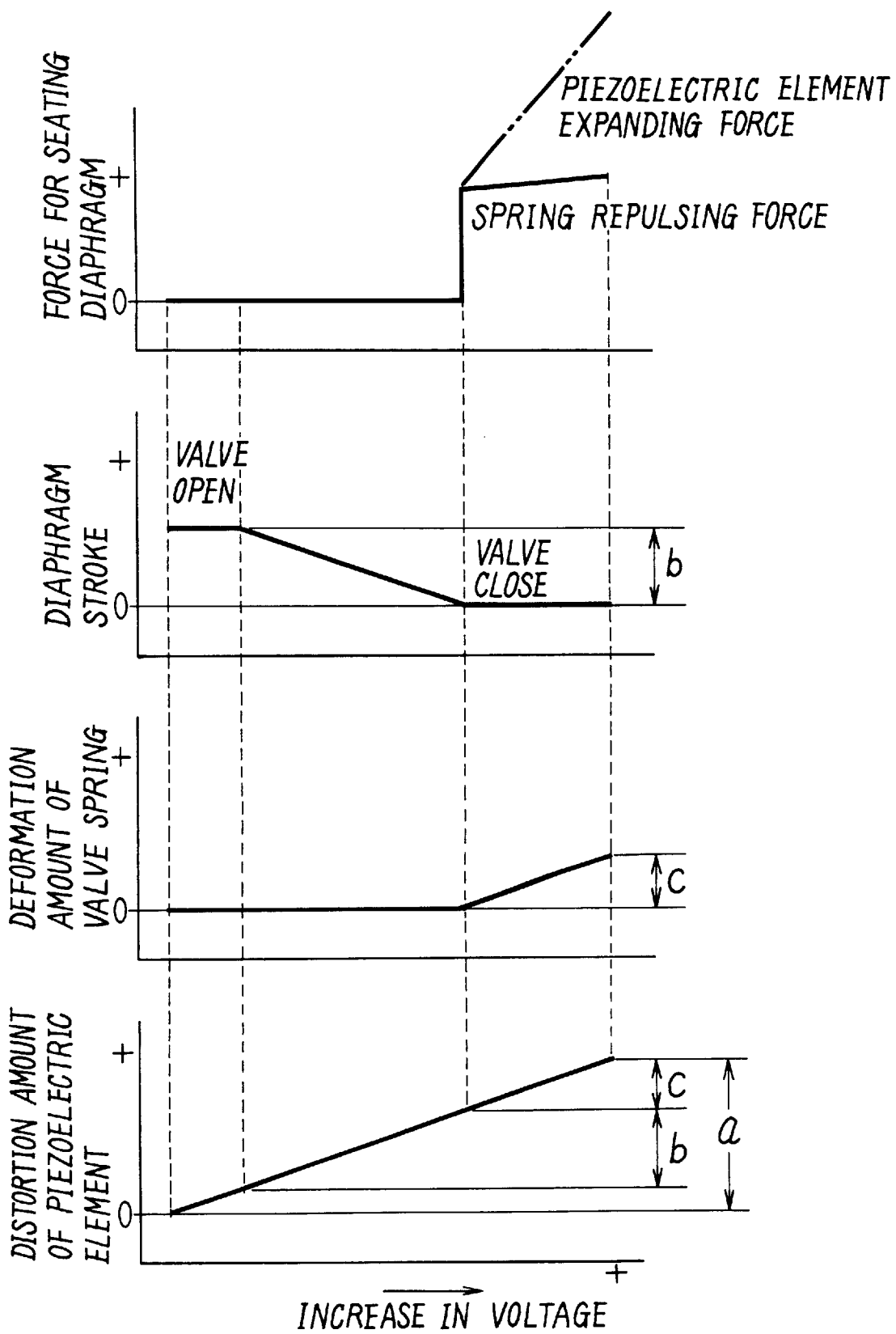
FIG. 3 is a diagram showing an operating state of the fluid control valve of the invention.

As shown in FIG. 3, a distortion amount (expanding length) a of the piezoelectric element laminate 20 in expansion is set to be equal to or greater than the sum of an opening/closing stroke b of the diaphragm valve 11 and a displacement amount c of the spring seat 28. As a result, the piezoelectric element laminate 20 seats the diaphragm valve 11 on the valve seat 10 and, at the same time, separates the spring seat 28 from the second stopper 30 to elastically deform the valve spring 29 in expansion of the piezoelectric element laminate 20.

A reference numeral 31 in the drawing designates a lead for feeding the piezoelectric element laminate 20 which is led out of the second casing 15 through holes formed in the second member 22, the adjusting screw 27, and the plate 24 and is connected to a control circuit 32. The control circuit 32 can be provided inside a cover 33 mounted to the second casing 15 as shown with a chain line in FIG. 1, for example. In this case, the control circuit 32 is connected to a controller (not shown) through a connector 34 provided to the cover 33.

In the fluid control valve having the above structure, in non-operation, i.e., in a state in which no voltage is applied to the piezoelectric element laminate 20 or a tiny voltage with which expansion required to maintain contact between the first member 21 and the pressing member 13 and between the second member 22 and the adjusting screw 27 is applied to the piezoelectric element laminate 20, the piezoelectric element laminate 20 is not in a required expanding state as shown in FIG. 1. Therefore, the diaphragm valve 11 separates from the valve seat 10 due to its own elastic force to maintain an open state of the valve. In this state, the pressing member 13 is locked to the first stopper 14, the spring seat 28 is locked to the second stopper 30, and the repulsing force of the valve spring 29 is not acting on the piezoelectric element laminate 20 and the diaphragm valve 11.

Figure 2:
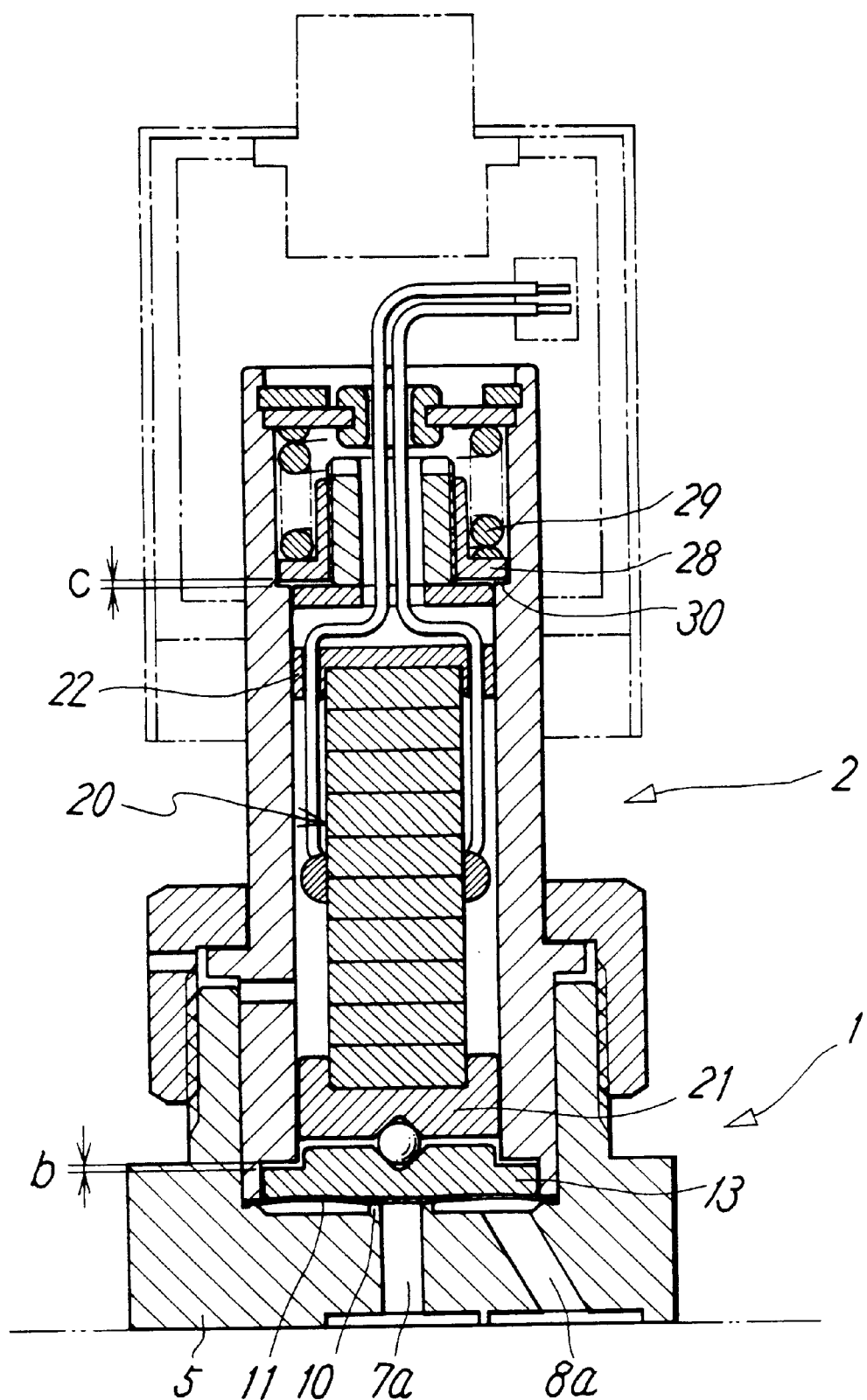
FIG. 2 is a sectional view of an operating state of the fluid control valve shown in FIG. 1.

If a certain amount of voltage is applied to the piezoelectric element laminate 20 in this state, the piezoelectric element laminate 20 expands in the axial direction, pushes the pressing member 13 through the first member 21 to thereby seat the diaphragm valve 11 on the valve seat 10, and pushes the spring seat 28 in a reverse direction to separate the spring seat 28 from the second stopper 30 to thereby elastically deform the valve spring 29 as shown in FIG. 2. As a result, the repulsing force of the valve spring 29 acts on the diaphragm valve 11 through the piezoelectric element laminate 20 and the diaphragm valve 11 is pressed against the valve seat 10 by the repulsing force. In other words, expanding force of the piezoelectric element laminate 20 is converted into the repulsing force of the valve spring 29 and the force for seating the diaphragm valve 11 on the valve seat 10 is obtained by the repulsing force. Therefore, as can be seen from FIG. 3, because the large expanding force of the piezoelectric element laminate 20 does not directly act on the diaphragm valve 11 and the valve seat 10, the diaphragm valve 11 and the valve seat 10 are not deformed or damaged and durability and safety are improved.

Although the coil spring is shown as the valve spring 29 in the above embodiment, the valve spring 29 may be a leaf spring, rubber, or other elastic members.

As described above, according to the invention, it is possible to obtain a normally opened piezoelectric fluid control valve which has a rational design structure and excellent durability and in which the force for closing the valve can be obtained by the repulsing force of the spring by converting the expanding force of the piezoelectric element laminate into the repulsing force of the spring.

What is claimed is:

1. A piezoelectric fluid control valve comprising a valve mechanism portion for opening and closing a fluid flow path by displacement of a diaphragm valve and a piezoelectric operating portion for opening and closing said diaphragm valve, wherein said valve mechanism portion includes in a first casing said fluid flow path, a valve seat provided at a midpoint of said fluid flow path, said diaphragm valve for coming in contact with and separating from said valve seat to open and close said flow path and applied with elastic force in such a direction as to separate from said valve seat, and a pressing member in contact with a back face of said diaphragm valve to be displaced with said diaphragm valve in opening and closing directions, said piezoelectric operating portion includes in a second casing connected to said first casing a piezoelectric element laminate for expanding due to application of a voltage, a first member disposed on one end side of said piezoelectric element laminate to transmit expanding force of said piezoelectric element laminate to said pressing member to seat said diaphragm valve on said valve seat, a second member disposed for displacement on the other end side of said piezoelectric element laminate, a spring seat displaced with said second member in expansion of said piezoelectric element laminate, and a valve spring elastically deformed by displacement of said spring seat to repulse said piezoelectric element laminate, and a distortion amount of said piezoelectric element laminate in expansion is set at such a value as to press said pressing member to seat said diaphragm valve on said valve seat and as to press said spring seat in a reverse direction to elastically deform said valve spring.

2. A fluid control valve according to claim 1, wherein said first casing of said valve mechanism portion and said second casing of said piezoelectric operating portion are connected to each other with an end of said second casing fitted in a valve hole of said first casing in which said valve seat is provided, an outer peripheral portion of said diaphragm valve is airtightly sandwiched and fixed between a tip end portion of said second casing and a peripheral bottom portion of said valve hole, and said pressing member is retained for displacement in said second casing.

3. A fluid control valve according to claim 1, wherein said spring seat is mounted such that a position of said spring seat can be adjusted by using an adjusting screw and said adjusting screw is displaced by said second member.

4. A fluid control valve according to claim 1, wherein said second casing of said piezoelectric operating portion has a first stopper to which said pressing member is locked to thereby restrict an opening stroke end of said diaphragm valve when said piezoelectric element laminate is not energized and a second stopper to which said spring seat is locked to thereby restrict an expanding end of said valve spring.

5. A fluid control valve according to claim 1, wherein said pressing member and said first member are in contact with each other through a ball fitted in depressions formed at centers of opposed faces.

6. A fluid control valve according to claim 1, wherein said first casing has on an end face thereof opposite to a side connected to said second casing a mounting face to be mounted to a unit substrate and a plurality of fluid ports communicating with said fluid flow path are provided to said mounting face.

7. A fluid control valve according to claim 1, wherein said first casing of said valve mechanism portion and said second casing of said piezoelectric operating portion are connected to each other with an end of said second casing fitted in a valve hole of said first casing in which said valve seat is provided, an outer peripheral portion of said diaphragm valve is airtightly sandwiched and fixed between a tip end portion of said second casing and a peripheral bottom portion of said valve hole, and said pressing member is retained for displacement in said second casing; and said second casing of said piezoelectric operating portion has a first stopper to which said pressing member is locked to thereby restrict an opening stroke end of said diaphragm valve when said piezoelectric element laminate is not energized and a second stopper to which said spring seat is locked to thereby restrict an expanding end of said valve spring.

8. A fluid control valve according to claim 7, wherein said spring seat is mounted such that a position of said spring seat can be adjusted by using an adjusting screw and said adjusting screw is displaced by said second member.

9. A fluid control valve according to claim 7, wherein said pressing member and said first member are in contact with each other through a ball fitted in depressions formed at centers of opposed faces.

10. A fluid control valve according to claim 7, wherein said first casing has on an end face thereof opposite to a side connected to said second casing a mounting face to be mounted to a unit substrate and a plurality of fluid ports communicating with said fluid flow path are provided to said mounting face.

* * * * *